UNITED STATES PATENT OFFICE.

C. H. BRAND, OF WILLIAMSBURG, NEW YORK.

IMPROVEMENT IN MANUFACTURE OF VELLUTED CLOTH.

Specification forming part of Letters Patent No. 5,534, dated April 25, 1848.

*To all whom it may concern:*

Be it known that I, C. H. BRAND, of Williamsburg, on Long Island, in the State of New York, have invented a new and Improved Composition and Process for Manufacturing a Chemical Velluted Cloth; and I do hereby declare that the following is a full and exact description of this my invention and the manufacturing of the same.

I take muslin, linen, or any cloth made of cotton or linen, fasten it with cords on frames. Then I take a smooth piece of pumice-stone and rub the same off with it. When this is done I apply to it, by a couple of large round knives or brushes made for this purpose, a composition made as follows: I take four gallons of linseed-oil, in which a quarter of a pound of india-rubber has been dissolved, which is done by putting it for about three hours on a strong coal-fire. Then I add one-fourth pound of beeswax, boil it again half an hour. After this I add one-fourth pound of gum-elemi and boil it one-fourth of an hour. Then I add one pound of asphalt, boil it again for about half an hour, and then at last I add two pounds of fine lampblack, mix it well together, and boil this again for about half an hour. This mass, when cold, is then applied as described above. When I have given the cloth a coat of the above-described mass I put it into the sun or into a warm place to dry. When dry I take water, put it on the cloth, and then I take a piece of a pumice-stone and rub it off with the water, dry it again and give it another coat, as before, and treat it in the same manner. If this is done, I apply to it a coat of the following composition, very thin and even: I take one pound of gum-copal, melt it in a suitable vessel, add to it one pound of linseed-oil in which one ounce of india-rubber has been dissolved. Then I take half a pound of japan and one pound of spirits of turpentine, add it, and let it get cold for use. If this mass is applied as above said, I take ground flock, throw it all over the cloth, and beat it from the under side with a couple of sticks till the flock has settled. Then it is dried and rubbed off with pumice-stone. The other side is done in the same way as the first. The prints are velluted in like manner as the cloth.

What I claim as my invention, and desire to secure by Letters Patent, is—

The composition of the above-named articles by which the ground flock is applied to the cloth.

C. H. BRAND.

Witnesses:
    A. MENSING,
    W. ZERSE.